United States Patent
Borlee

(10) Patent No.: US 8,682,618 B2
(45) Date of Patent: Mar. 25, 2014

(54) SYSTEM FOR TRANSMITTING DATA FROM A MEASUREMENT SENSOR FOR REMOTE LOGGING WITH TIME STAMPING

(75) Inventor: Jean-Paul Borlee, Bures sur Yvette (FR)

(73) Assignee: Suez Environnement (FR)

(\*) Notice: Subject to any disclaimer, the term of this patent is extended or adjusted under 35 U.S.C. 154(b) by 726 days.

(21) Appl. No.: 12/922,183

(22) PCT Filed: Mar. 6, 2009

(86) PCT No.: PCT/FR2009/000235
§ 371 (c)(1),
(2), (4) Date: Sep. 13, 2010

(87) PCT Pub. No.: WO2009/115708
PCT Pub. Date: Sep. 24, 2009

(65) Prior Publication Data
US 2011/0004445 A1    Jan. 6, 2011

(30) Foreign Application Priority Data
Mar. 13, 2008 (FR) .................... 08 01375

(51) Int. Cl.
G06F 17/40 (2006.01)
(52) U.S. Cl.
USPC .................................... 702/187
(58) Field of Classification Search
USPC .................................... 702/187
See application file for complete search history.

(56) References Cited

U.S. PATENT DOCUMENTS

| | | | |
|---|---|---|---|
| 5,481,471 A * | 1/1996 | Naglestad et al. | 714/734 |
| 7,558,157 B1 * | 7/2009 | Gardner et al. | 368/10 |
| 2003/0048801 A1 * | 3/2003 | Sala et al. | 370/445 |
| 2005/0169233 A1 | 8/2005 | Kandala et al. | |
| 2007/0178842 A1 | 8/2007 | Ii | |
| 2007/0268938 A1 * | 11/2007 | Dowd | 370/509 |
| 2009/0300379 A1 * | 12/2009 | Mian et al. | 713/300 |
| 2010/0192001 A1 * | 7/2010 | Cornwall et al. | 713/400 |

FOREIGN PATENT DOCUMENTS

| | | |
|---|---|---|
| FR | 2896067 A1 | 7/2007 |
| WO | WO-2008044193 A2 | 4/2008 |

OTHER PUBLICATIONS

Dapper et al., RF Propagation in Short Range Sensor Communications, Unattended Ground Sensor Technologies and Applications V, Proceedings of SPIE vol. 5090 (2003).*

* cited by examiner

Primary Examiner — John E Breene
Assistant Examiner — Timothy H Hwang
(74) Attorney, Agent, or Firm — The Belles Group, P.C.

(57) ABSTRACT

System for transmitting data for remote logging between a measurement sensor ($1a$, $1b$) comprising an electronic circuit with non-synchronized internal clock and a memory for storing at least one value measured at a first instant ($t_1$), and a transmitter (7) suitable for transmitting at a second instant ($t_2$) the value or values measured at the first instant ($t_1$), and a receiver (12, 12a) synchronized to a reference time base, for gathering the measured values transmitted; the sensor ($1a$, $1b$) comprising an electronic circuit suitable for establishing the time difference $\Delta t$ ($t_2 - t_1$) between the instants of transmission ($t_2$) and of measurement ($t_1$) according to the internal clock of the sensor, and the transmitter (7) transmits, with the value or values measured at the first instant ($t_1$), this time difference $\Delta t$; and the receiver comprises a circuit for subtracting from the reception instant ($T_0$) according to the reference time base, the time difference ($\Delta t$) transmitted via the transmitter so as to give the difference ($T_0 - \Delta t$) as date to the measurements transmitted.

9 Claims, 2 Drawing Sheets

SYSTEM FOR TRANSMITTING DATA FROM A MEASUREMENT SENSOR FOR REMOTE LOGGING WITH TIME STAMPING

CROSS REFERENCE TO RELATED APPLICATIONS

This application is a National Phase filing under 35 U.S.C. §371 of PCT/FR2009/000235 filed on Mar. 6, 2009; and this application claims priority to Application No. 0801375 filed in France on Mar. 13, 2008 under 35 U.S.C. §119; the entire contents of all are hereby incorporated by reference.

The invention relates to a system for transmitting data for remote logging between:
- a measurement sensor comprising an electronic circuit with a non-synchronized internal clock and a memory for storing at least one value measured at a first time ($t_1$) of the internal clock, and a transmitter suitable for transmitting, at a second time ($t_2$) of the internal clock, the value or values measured at the first time ($t_1$),
- and a receiver synchronized to a reference time base for gathering the transmitted measured values.

The invention generally relates to physical measurement sensors, in particular fluid meters (water, gas, electricity, thermal energy, heating cost distributor), temperature, pressure and flow sensors, etc. More precisely, the invention relates to autonomous sensors which regularly store measured values of physical quantities and transmit them subsequently by any transmission means, for example by radio or by a wired system.

The number of distributed sensors, that is to say spread over a large geographic area, intended for making physical measurements and for transmitting data coming from these measurements to a central system receiver has been rapidly increasing for several years.

This number of sensors is required to increase further in order to improve the monitoring and management of equipment and networks of all types, in particular water, gas, energy and drainage networks.

This multiplication of the number of autonomous sensors has been made possible by the increasingly successful integration of the electronic circuits of the sensors together with the lowering of their electrical consumption. At the same time, electrical batteries, in particular lithium batteries, have achieved a capacity and reliability which makes them suitable for powering sensors in good conditions for durations of several years and, in certain cases, for up to 20 years.

Autonomous sensors generally integrate a microprocessor-based electronic circuit which allows the periodic reading of the physical quantity or quantities in question. The period and the time of the reading are decided on the basis of the internal clock of the electronic circuit which generally is not synchronized to a reference time base, in particular to the universal time base (UTC).

The reasons for this absence of synchronization to a reference time base are:
- on the one hand, the fact that the internal clock of the electronic circuit is generally composed of low cost components whose daily drift is significant (of the order of several seconds per day) such that the cumulative drift becomes significant after several years of operation;
- on the other hand, the fact that a periodic synchronization with an external reference is often made impossible because it necessitates a bidirectional and regular link between the sensor and the reference time base.

In order to reduce the cost of the sensors as well as their consumption, it is advantageous for the sensors to use only a unidirectional link for transmitting their data. In other words, the sensors do not comprise a receiver capable of gathering information from a reference time base for a synchronization.

Moreover, even if a bidirectional link were to exist, the time stamping would not be accurate in the case where the sensor would have accumulated data over a long period without the clock synchronization having been made possible following a loss of communication link between the sensor and the reference time base.

The results of the physical measurements made by the sensor at a given time $t_1$, according to the internal clock, are transmitted subsequently to a receiver by any appropriate means, for example once a day, by means of a wired link or by radio, at a given time $t_2$ according to the internal clock.

The receiver of the information sent by the sensors is in particular constituted by a centralizing equipment, in particular a data processing system, which is synchronized to a reference time base, generally the UTC clock. In these conditions, when the receiver receives a piece of information from a sensor, it can determine the precise time $T_0$, according to the reference time base, at which this piece of information is received.

However, for an efficient management by remote logging, in particular for water or energy distribution networks, it is important to know with sufficient precision the time at which the measurement was made. A precision of the order of a few tens of seconds with respect to the reference time base is sufficient, for example, for a detection of leakage in a water installation by measurement carried out during the night, generally between 02.00 and 03.00 a.m. or for applying a different consumption tariff, in particular for energy, according to daytime or night-time hours, or according to the winter or summer period.

The principal purpose of the invention is to make it possible to establish accurate time stamping, in a reference time base, of the data of measurements transmitted, after storage in memory, by autonomous sensors not synchronized to the reference time base, in particular to the UTC clock.

According to the invention, the data transmission system comprises:
- at least one measurement sensor, comprising an electronic circuit with a non-synchronized internal clock and a memory for storing at least one value measured at least a first time ($t_1$) according to the internal clock, and a transmitter for transmitting, at a second time ($t_2$) of the internal clock, the measured values,
- a receiver synchronized to a reference time base for gathering the information transmitted by the sensor or sensors, and is characterized in that:
- the sensor comprises an electronic circuit capable of establishing the time difference $\Delta t=(t_2-t_1)$ between the times of transmission ($t_2$) and of measurement ($t_1$) according to the internal clock of the sensor, and the transmitter transmits, with the value or values measured at the first time ($t_1$), this time difference $\Delta t$,
- and the receiver comprises a circuit for subtracting from the time of reception ($T_0$), according to the reference time base, the time difference ($\Delta t$) transmitted by the transmitter in order to give the difference ($T_0-\Delta t$) between the time of reception ($T_0$), according to the reference time base, and the time difference ($\Delta t$) between the transmission and the measurement as a time stamp to the transmitted measurements.

Over short periods, of the order of one day, the internal clock of the sensor is sufficiently precise for the drift $\Delta t$ to remain accurate, such that the calculated date is perfectly valid, to within a few seconds depending on the practical cases.

The invention thus makes it possible to carry out a satisfactory time stamping, a posteriori. The precision is generally less than 30 seconds on the reference time base.

The transmission time between the transmitter and the receiver is generally very short, of the order of 100 ms for example for a radio transmission. It will therefore generally be possible to ignore it in the calculations. It can however be taken into account.

The invention notably relates to a measurement sensor for a fluid meter, a water meter in particular.

The transmission system can comprise a repeater between the sensor and the receiver, this repeater comprising a non-synchronized internal clock. The repeater receives, at a time ($t_3$) according to its internal clock, the information coming from the sensor and transmits this information to the receiver at a time ($t_4$) according to its internal clock. According to the invention, the repeater also comprises an electronic circuit capable of establishing the time difference $\Delta t_1 = (t_4 - t_3)$ between the times of transmission ($t_4$) and reception ($t_3$) based on the internal clock of the repeater, which transmits the measured values together with this time difference $\Delta t_1$ and the time difference $\Delta t$ coming from the sensor; the receiver comprises a circuit suitable for determining the measurement time by subtracting from the time of reception $T_0$, according to the reference time base, the sum of the differences $\Delta t + \Delta t_1$ provided by the sensor and the repeater. The repeater can comprise a circuit establishing the sum of the time differences $\Delta t + \Delta t_1$ and can transmit this sum to the receiver with the measured values.

In the case where the transmission system comprises several non-synchronized repeaters, according to the invention each repeater transmits, with the information relating to the measured data, the time difference according to its internal clock between the time of transmission of the signal and the time of reception.

The sensors and receivers are generally equipped with electronic circuits of the microprocessor type and the arithmetic operations for determining the differences $\Delta t$, $\Delta t_1$, can be carried out without an additional electronic circuit by programming the microprocessor for this purpose.

The message transmitted by the sensor and the repeater or repeaters is advantageously constituted by a frame comprising, in a first part, references making it possible to identify the sensor and, in a second part, the data of values measured by the sensor and, in a third part, the time differences $\Delta t$, and possibly $\Delta t_1$, making it possible to determine the age of the measurement.

The transmitter of the sensor can comprise a capacitor which accumulates the energy to make it possible for the transmitter to transmit the measured data when the charge of the capacitor is sufficient. The measured data is not transmitted at the time when the measurement is carried out and the charging time of the capacitor can vary by several minutes.

A random delay can be provided between the time of measurement and the time of transmission in order to avoid collisions and mixed frames between the transmissions of different sensors. Redundancy of the transmission is provided, also according to a random time interval, in order to avoid successive collisions between the transmissions of different sensors.

Preferably, when the transmission of the data is carried out by radio, a VHF transmission is used. The power of the sensor's transmitter can be of the order of 100 mW.

The invention consists, apart from the arrangements described above, of a certain number of other arrangements which will be relevant hereafter with respect to an example of the embodiment described with reference to the appended drawings, but which is in no way limiting. In these drawings.

Figure 1:
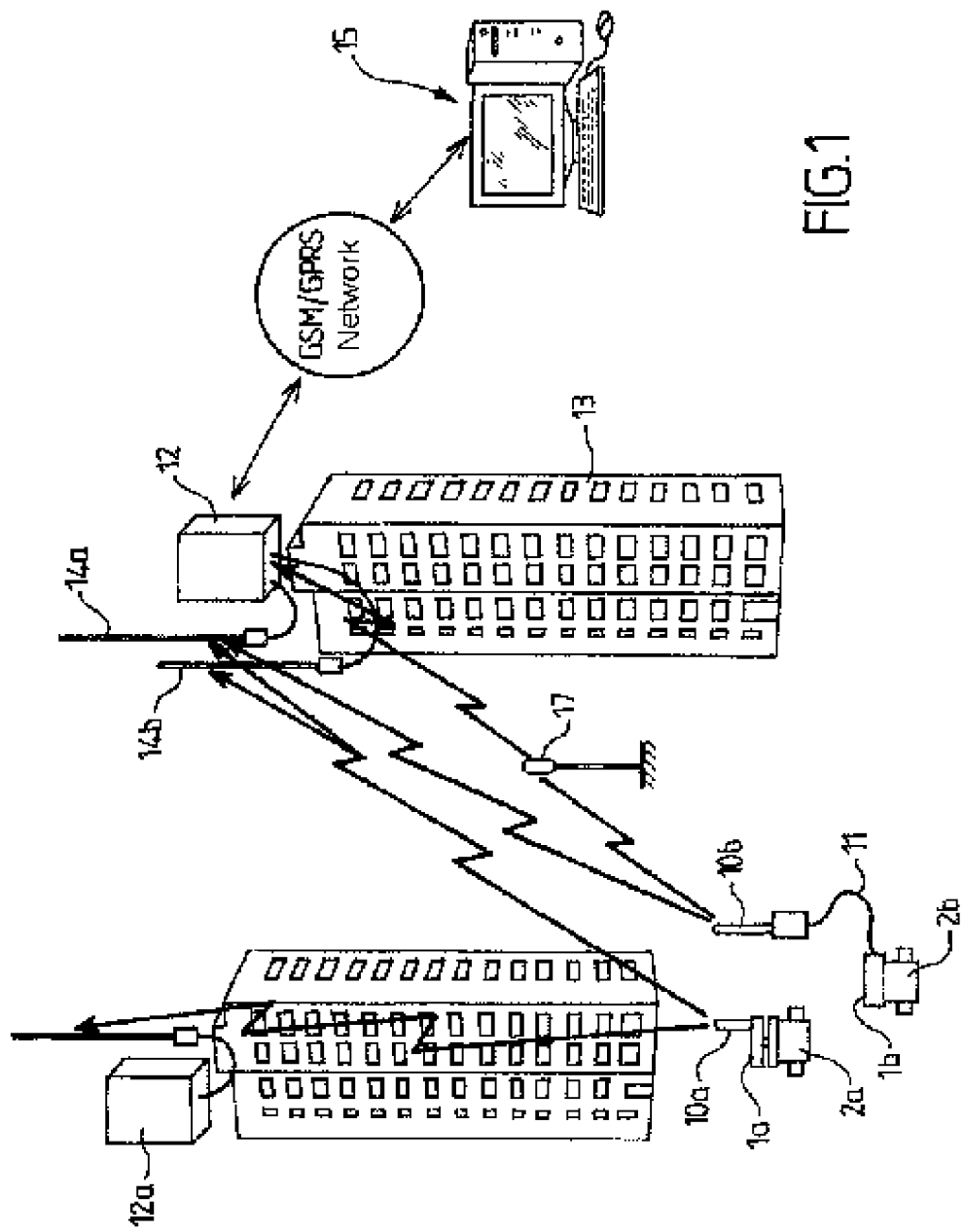
FIG. 1 is a diagram of a remote logging system with a fixed network for fluid sensors, notably for water meters, in which the invention is used.

With reference to FIG. 1 of the drawings, a system for the transmission of data from measurement sensors 1a, 1b for remote logging, notably in a fixed network, can be seen.

The example shown in FIG. 1 relates to water meters 2a, 2b, but the invention generally applies to physical measurement sensors, not only to fluid sensors (water, gas, electricity, thermal energy, heating cost distributor), but also to temperature, pressure and flow sensors.

The sensors 1a, 1b, are provided for detecting the rotational movement of a part, notably a metal sector, which carries out a number of turns proportional to the volume of water which passes through the associated meter.

Figure 2:
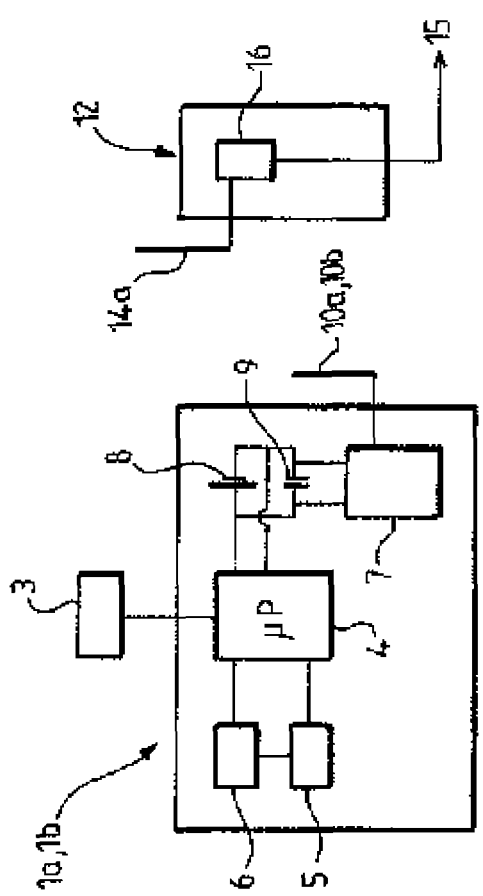
FIG. 2 is a basic block diagram of a sensor and of a receiver according to the invention.

As shown diagrammatically in FIG. 2, each measurement sensor 1a, 1b, comprises a transducer 3 for converting the mechanical displacement of the metal sector of the meter into an electrical signal. The transducer 3 is connected to an electronic circuit, advantageously constituted by a microprocessor 4, or equivalent circuit. An internal clock 5 controls the circuit 4. The sensor is autonomous and the clock 5 is not synchronized to a reference time base, notably the UTC universal time base. A memory 6 is provided for storing at least one value measured at a first time $t_1$ of the internal clock.

Each sensor furthermore comprises a transmitter 7 capable of transmitting, at a second time $t_2$ of the internal clock, the value or values measured at the first time $t_1$.

A battery 8, notably a lithium battery, supplies the energy necessary for the operation of the microprocessor 4 and the transmitter 7. A capacitor 9 can be connected to the terminals of the battery 8 and to the power supply terminals of the transmitter 7. The power supply of the transmitter 7, at the time of transmission, is provided by the discharge of the energy stored in the capacitor 9, which makes it possible to use a battery 8 of reduced size. Between two transmissions of the transmitter 7, it is necessary to wait until the capacitor 9 has reached a sufficient charge.

The transmitter 7 is connected to an antenna such as 10a (FIG. 1) directly fixed to the sensor or to a remote antenna such as 10b (FIG. 1) located at a distance from the sensor 1b and connected to the latter by a cable 11.

At least one receiver 12 is provided for gathering the measured values transmitted by a plurality of sensors spread over a large geographic area. The receiver 12 can be installed on a roof of a building 13 with a pair of antennas 14a, 14b, spaced on the roof of the building in order to improve the reception conditions.

The information transmitted by radio by a same sensor 1a can be gathered by several different receivers, for example 12, 12a, installed in different places.

The transmission of information from the sensor to the receiver is advantageously provided by VHF radio, and the power of the transmitter 7 of a sensor is advantageously of the order of 100 mW (milliwatts).

The receiver 12, 12a is synchronized to a reference time base, notably the UTC universal time base. The receiver 12, 12a organizes the gathered information and sends it by radio (GSM/GPRS network), or by wire, to an information system 15 for remote logging.

The link between the receivers 12 and 12a and the system 15 is bidirectional with data exchange in both directions. The link between the sensors 1a, 1b and the receiver 12 is, on the contrary, unidirectional, that is to say that the receiver 12 receives information from the sensors, but that the latter cannot receive any information from the receiver. This unidirectional link makes it possible to simplify the construction of the sensors 1a, 1b and also makes it possible to reduce their consumption. However, because the internal clock of the sensors is not synchronized to a reference time base, a precise time stamping of the transmitted data cannot be established directly on the basis of the time stamps provided by this internal clock.

The purpose of the invention is to solve this time stamping problem.

The memory 6 of the sensor stores the value measured at a first time $t_1$ according to the internal clock. The transmitter 7 transmits this measured value at a second time $t_2$ of the internal clock.

In order to provide a sufficiently precise time stamping, the sensor 1a, 1b comprises an electronic circuit, constituted by the microprocessor 4 in the present case, capable of establishing the time difference $\Delta t = t_2 - t_1$ between the times of transmission $t_2$ and of measurement $t_1$ according to the internal clock of the sensor. The microprocessor 4 is programmed to calculate this time difference $\Delta t$.

The difference $\Delta t$ is communicated to the transmitter 7 which transmits it with the measured value or values.

The receiver 12, 12a comprises a circuit 16, notably a microprocessor, in order to subtract from the time of reception $T_0$, according to the reference time base, the time difference $\Delta t$ transmitted by the transmitter 7. The time stamp given by the receiver to the transmitted measurements is the difference $T_0 - \Delta t$ between the time of reception $T_0$, according to the reference time base, and the time difference $\Delta t$.

The drift of the internal clock of the sensor over a relatively short period, of the order of a day, is sufficiently small for the difference $\Delta t$ to remain precise and for the time stamp thus calculated to be perfectly valid to within a few seconds.

It therefore becomes possible to establish information on the distribution network at a given time, in particular to carry out leakage detections by measurement of consumption during off-peak times, for example between 02.00 and 03.00 a.m. when the consumption must be virtually zero. It also becomes possible to apply different tariffs, for example between day and night or between winter and summer.

The transmission system can comprise one or more non-synchronized repeaters 17 between the sensor 1a, 1b and the receiver 12. According to the invention, each repeater 17 comprises an electronic circuit which calculates and transmits, with the information relating to the measured data, the sum of the difference $\Delta t$ and of the time difference $\Delta_1$ between the time of transmission $t_4$ by the repeater 17 and the time of reception $t_3$ by that same receiver, based on its internal clock. The repeater 17 therefore transmits the sum $\Delta t + \Delta t_1$ with the measured values information.

The receiver 12 gathers, at the time of reception $T_0$, according to the reference time base, the measured values information and the sum of the differences $\Delta t + \Delta t_1$. The circuit 16 of the receiver carries out the subtraction between $T_0$ and $(\Delta t + \Delta t_1)$ in order to time stamp the measurement at the time $T_0 - (\Delta t + \Delta t_1)$.

As a variant, the repeater can not carry out the calculation of the sum $\Delta t + \Delta t_1$, which is carried out in the receiver 12 from the values $\Delta t$ and $\Delta t_1$ transmitted by the receiver 17 with the results of the measurements.

In the case of several repeaters, the differences $\Delta t_n$ introduced by each repeater would be taken into account.

Figure 3:
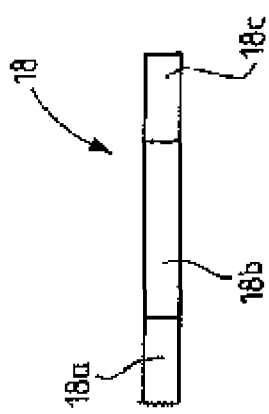
FIG. 3 is a diagram of a transmitted frame.

The message transmitted by a sensor, as well as by a repeater, is constituted by a frame 18, shown diagrammatically in the form of a rectangular strip in FIG. 3, comprising: in a first part 18a, references making it possible to identify the sensor 1a, 1b; in a second part 18b, the data of the values measured by the sensor and, in a third part 18c, the time differences $\Delta t$ and possibly $\Delta t_1$, making it possible to determine the age of the measurement.

Preferably, the transmission of the information by the sensor 1a, 1b is redundant, with random time intervals between the successive repeated transmissions, in order to avoid collisions and mixed frames between the transmissions of different sensors.

A redundancy of three or four times, notably with an interval of a few hours, in particular of the order of 6 hours, makes it possible to avoid loss of information due to a temporary obstacle, for example a parked truck forming an obstacle to good transmission.

The invention makes precise time stamping of data transmitted by unidirectional, non-synchronized sensors possible.

The invention claimed is:

1. A data transmission system for remote logging, the system comprising:
   a measurement sensor, comprising an electronic circuit with a non-synchronized internal clock and a memory for storing at least one value measured at a first time ($t_1$) of the internal clock, and a transmitter configured to transmit, at a second time ($t_2$) of the internal clock, the value or values measured at the first time ($t_1$),
   and a receiver synchronized to a reference time base for gathering the transmitted measured values, wherein:
   the sensor comprises an electronic circuit configured to establish the time difference $\Delta t = (t_2 - t_1)$ between the times of transmission ($t_2$) and of measurement ($t_1$) according to the internal clock of the sensor, and the transmitter being further configured to transmit, with the value or values measured at the first time ($t_1$), this time difference $\Delta t$,
   and the receiver comprises a circuit configured to subtract from the time of reception ($T_0$), according to the reference time base, the time difference ($\Delta t$) transmitted by the transmitter in order to give the difference ($T_0 - \Delta t$) between the time of reception ($T_0$), according to the reference time base, and the time difference ($\Delta t$) between the transmission and the measurement as a time stamp to the transmitted measurements.

2. The data transmission system as claimed in claim 1, wherein the measurement sensor is a sensor for a fluid meter.

3. The data transmission system as claimed in claim 1, comprising a repeater between the sensor and the receiver, the repeater comprising a non-synchronized internal clock, wherein the repeater receives, at a time ($t_3$) according to its internal clock, transmitted information coming from the sensor and transmits this information to the receiver at a time ($t_4$) according to its internal clock, comprises an electronic circuit configured to establish the time difference $\Delta t_1 = (t_4 - t_3)$ between the times of transmission ($t_4$) and reception ($t_3$), based an the internal clock of the repeater, which transmits the measured values together with this time difference $\Delta t_1$ and the time difference $\Delta t$ coming, from the sensor, the receiver comprising a circuit suitable for determining the measurement time by subtracting from the time of reception $T_0$, according to the reference time base, the sum of the differences $\Delta t + \Delta t_1$ provided by the sensor and the repeater.

4. The data transmission system as claimed in claim 3, wherein the repeater comprises a circuit establishing the sum of the time differences $\Delta t+\Delta t_1$ and transmits this sum to the receiver with the measured values.

5. The data transmission system as claimed in claim 3, wherein the sensors and receivers are equipped with electronic circuits of the microprocessor type programmed for carrying out the arithmetic operations in order to determine the time differences $\Delta t$, $\Delta t_1$, and the sums $(\Delta t+\Delta t_1)$ of these differences.

6. The data transmission system as claimed in claim 1, wherein the transmitter of the sensor comprises a capacitor which accumulates energy from an energy source to make it possible for the transmitter to transmit the measured data when the charge of the capacitor is sufficient.

7. The data transmission system as claimed in claim 1, wherein information transmitted by the sensor is formed as a frame comprising in a first part references making it possible to identify the sensor, in a second part the data of the values measured by the sensor, and in a third part the time differences $\Delta t$, making it possible to determine the age of the measurement.

8. The data transmission system as claimed in claim 1, wherein the data transmission is carried out by VHF radio.

9. The data transmission system as claimed in claim 8, wherein the power of the transmitter of the sensor is about 100 mW.

* * * * *